(12) United States Patent
Merritt

(10) Patent No.: US 7,252,806 B1
(45) Date of Patent: Aug. 7, 2007

(54) FLUE GAS CONVERSION APPARATUS AND METHOD

(75) Inventor: Thomas D. Merritt, Miami, FL (US)

(73) Assignee: Pet Projects Inc., Miami, FL (US)

( * ) Notice: Subject to any disclaimer, the term of this patent is extended or adjusted under 35 U.S.C. 154(b) by 0 days.

(21) Appl. No.: 09/475,499

(22) Filed: Dec. 30, 1999

(51) Int. Cl.
B01J 8/02 (2006.01)
B01J 19/08 (2006.01)
F01N 3/10 (2006.01)

(52) U.S. Cl. .................... 422/168; 422/186; 422/189; 422/190; 422/170; 422/171; 60/299; 60/300

(58) Field of Classification Search .................... None
See application file for complete search history.

(56) References Cited

U.S. PATENT DOCUMENTS

| | | | | |
|---|---|---|---|---|
| 3,720,885 A | * | 3/1973 | Koloc | 372/58 |
| 3,969,083 A | * | 7/1976 | Givens et al. | 422/171 |
| 4,469,574 A | * | 9/1984 | Keehn et al. | 204/157.61 |
| 5,569,441 A | * | 10/1996 | Engler et al. | 423/212 |

* cited by examiner

Primary Examiner—Glenn A. Caldarola
Assistant Examiner—Jennifer A. Leung

(57) ABSTRACT

An apparatus and method of converting flue gases produced by a fossil fuel burning furnace boiler is disclosed. The flue gas is separated into its constituent parts by cooling and filtering. Carbon dioxide, the main constituent, is then converted to carbon monoxide in a laser powered gas converter in which carbon is a catalyst. The laser powered converter also produces hydrogen from steam, and the two newly produced gases are chemically combined to produce a hydrocarbon fuel product which can then be burned in the furnace boiler. In this manner no harmful greenhouse gases are permitted to escape to the atmosphere.

3 Claims, 3 Drawing Sheets

FLUE GAS CONVERSION APPARATUS AND METHOD

BACKGROUND OF THE INVENTION

1. Field of the Invention

The present invention relates to an apparatus and method of utilizing the flue gas mixture produced from burning fossil fuels, particularly the gaseous carbon dioxide constituent of the mixture, thereby eliminating the release of greenhouse gases into the earth's atmosphere.

2. Description of the Related Art

A recently discovered consequence of our industrial age is an increase of the concentration of carbon dioxide ($CO_2$), a trace element in our Earth's atmosphere. It is known that just before the industrial revolution the $CO_2$ content of the atmosphere was 280 parts per million (ppm). In 1989 the $CO_2$ content was a little over 350 ppm. This increase in a relatively short period of time is an apparent indication that an overload condition exists upon elements which behave as natural sinks for this gas. These elements, namely the oceans, vegetation, and rocks have so far been able to function perfectly as natural sinks throughout the ages, having only been exposed to the natural occurring sources of carbon dioxide such as fires and volcanic sources. However this recent addition by anthropogenic sources, such as industrial processes which rely upon the burning of fossil fuels, has increased the concentration of $CO_2$ in the atmospheric makeup to the point where certain adverse effects are now apparent. The most obvious effect is a phenomena known as "greenhouse effect", a potentially dangerous phenomena which if left unchecked could possibly reap catastrophic consequences upon the human race. This effect is theorized by climatologists to bring about a rise in the mean temperature of the worlds oceans, thereby melting polar ice and increasing the mean sea level of the oceans. In fact, recent independent studies by Russian and American scientists have shown that the prediction of temperature rises in the polar regions have been correct. Sonar readings from British submarines patrolling this region have shown the ice to be one third as thick in the last thirty years. The British have a legitimate concern as the local effect upon Britain will be Russian like winters, replacing the moderate winters of present times. Since the mid-nineteen eighties Eskimos have reported spring arriving one month early, and autumn arriving one month late. It is also theorized that this phenomena will result in a greater number and severity of hurricanes. In fact meteorologists at the Massachusetts Institute of Technology (MIT) have calculated a relationship between sea surface temperatures and the central low pressure of a tropical cyclone. It was shown the cyclone pressures could decrease substantially with increasing sea-surface temperatures. Increases of ocean temperatures of only a few degrees could increase the intensity of hurricanes by as much as 40% based on typical greenhouse warming projections. In 1998 such a violent hurricane named "Mitch", caused the devastation of the entire infrastructure of the Central American country, Honduras, taking the lives of nearly twenty thousand people as well. A more recent event in November of 1999, which has officially been recorded as the most powerful cyclone to date, struck the nation of India killing twenty thousand people and left twenty million people homeless. Recent floods worldwide have been attributed to excess water vapor in the atmosphere, another predicted result of greenhouse effect. One such flood in December of 1999, the result of a torrential downpour, killed an estimated 35,000 people and left untold hundreds of thousands homeless in and around Caracas, Venezuela. It is only natural to assume the human and economic toll will only increase as time goes by with no effort made to reduce anthropogenic carbon dioxide emissions. It is entirely possible the effect will eventually evolve into a stage known as "runaway greenhouse" which will eliminate all Human life forms from the surface of the Earth. To the trained eye it is obvious an emergency situation is eminent.

Accordingly, with the demand for electric power increasing steadily worldwide, thereby increasing the amount of fossil fuels being burned, it is readily apparent some corrective measure must be taken to alleviate this situation. While converting all electric utilities to nuclear power is completely unrealistic, there exists a need in the art for the emergence of fossil fuel burning electric power generation plants which possess the ability to contain all of the resultant emissions, and doing so while operating in an efficient manner. My previously issued U.S. Pat. Nos. 5,027,720, 5,129,331 and 5,265,424 address this issue to some extent. However, these designs do not adequately address the final disposition of the enormous quantities of carbon dioxide produced by a fossil fuel burning furnace boiler. The inventive system disclosed herein will create useful products from the resultant flue gases. Thus no harmful exhaust gases are permitted to escape into the atmosphere, overcoming the disadvantages of the prior art, and providing a much needed solution to a difficult environmental dilemma.

SUMMARY OF THE INVENTION

It is the object of the present invention to provide an apparatus and method for recycling the flue gases which result from the burning of fossil fuels, whereby the constituent flue gas, carbon dioxide, is prohibited from entering the earth's atmosphere.

It is a further object of the invention to utilize a constituent of the flue gas, namely carbon dioxide, as the actual source of power in the process of converting it to a useful product.

It is yet another object of the invention to create other useful products from the flue gases whereby the energy penalty of operating the apparatus will be minimized.

The objects of the present invention are fulfilled by providing a means and method for extracting and recycling the resultant flue gas stream caused by the burning of fossil fuels such as coal, oil, and natural gas. Included are flue gas cooling and conditioning means. Further included is a fluid conduit means to direct the flow of the fluid process throughout the entire system.

Flue gas exits a source which in this example is a furnace boiler system, passing through cyclones to eliminate particulate matter. If natural gas or oil is the fuel being burned, the cyclones are not necessary. Assuming the combustion in the furnace boiler is under stoichiometric conditions, the approximate temperature of the flue gas exiting is 355 degrees Fahrenheit. The flue gas which is a mixture of $N_2$, $CO_2$, $S_2$, and $O_2$ is then subjected to various stages of heat exchange, cooling and conditioning until the carbon dioxide and nitrogen are the only remaining constituents. If coal is the fuel being burned the remaining mixture is nitrogen ($N_2$), oxygen ($O_2$) and $CO_2$, with the ratio of $N_2$ to $CO_2$ approximately 3:1 in favor of $N_2$. If natural gas is the fuel then the remaining gas mixture is $N_2$, and $CO_2$. Carbon dioxide is separated from the mixture. It should be noted that this operation generally poses a high energy penalty, conversely the mixture will be disassociated in a proprietary process of low energy consumption not within the scope of this patent application. Having separated the mixture, the nitrogen of which an enormous quantity exists, is saved for sale and other uses. The gaseous carbon dioxide is introduced into a laser powered gas converter. The carbon dioxide is utilized as a reactant in the converter wherein it is converted into a hydrocarbon fuel product. The converter is powered by a flowing gas laser otherwise known as a gas dynamic laser, and utilizes in its operation a purified portion of the carbon dioxide from the source. Such a laser is manufactured by United Technologies Inc. and is marketed for industrial uses. The completely assembled gas converter apparatus comprises a means to create a powerful infrared laser beam, and at least one but preferably a plurality of catalytic converters. Any variety of chemical compounds can be created by the converter from selected gases introduced into the device depending upon which catalyst is utilized. The infrared laser beam is passed through a beam splitter forming two beams. In this manner the beam radiates two catalytic converters simultaneously. It should be understood that the beam can be split into several beams and a separate task in another vicinity, such as communications, can be performed with the beam. Other tasks normally associated with a laser can also be performed. The above summary has described the actual creation of a producer gas fuel as well as other useful products from the emissions of a furnace boiler system. Further, utilizing a constituent of the flue gas as the medium in a laser, then as a reactant within a catalytic converter radiated by the laser, is in essence utilizing carbon dioxide to convert itself into fuel, producing a new and surprising result.

BRIEF DESCRIPTION OF THE DRAWINGS

The above and yet other objects of the present invention and the attendant advantages will become more readily apparent by reference to the drawings wherein.

DETAILED DESCRIPTION OF THE INVENTION

Figure 1:
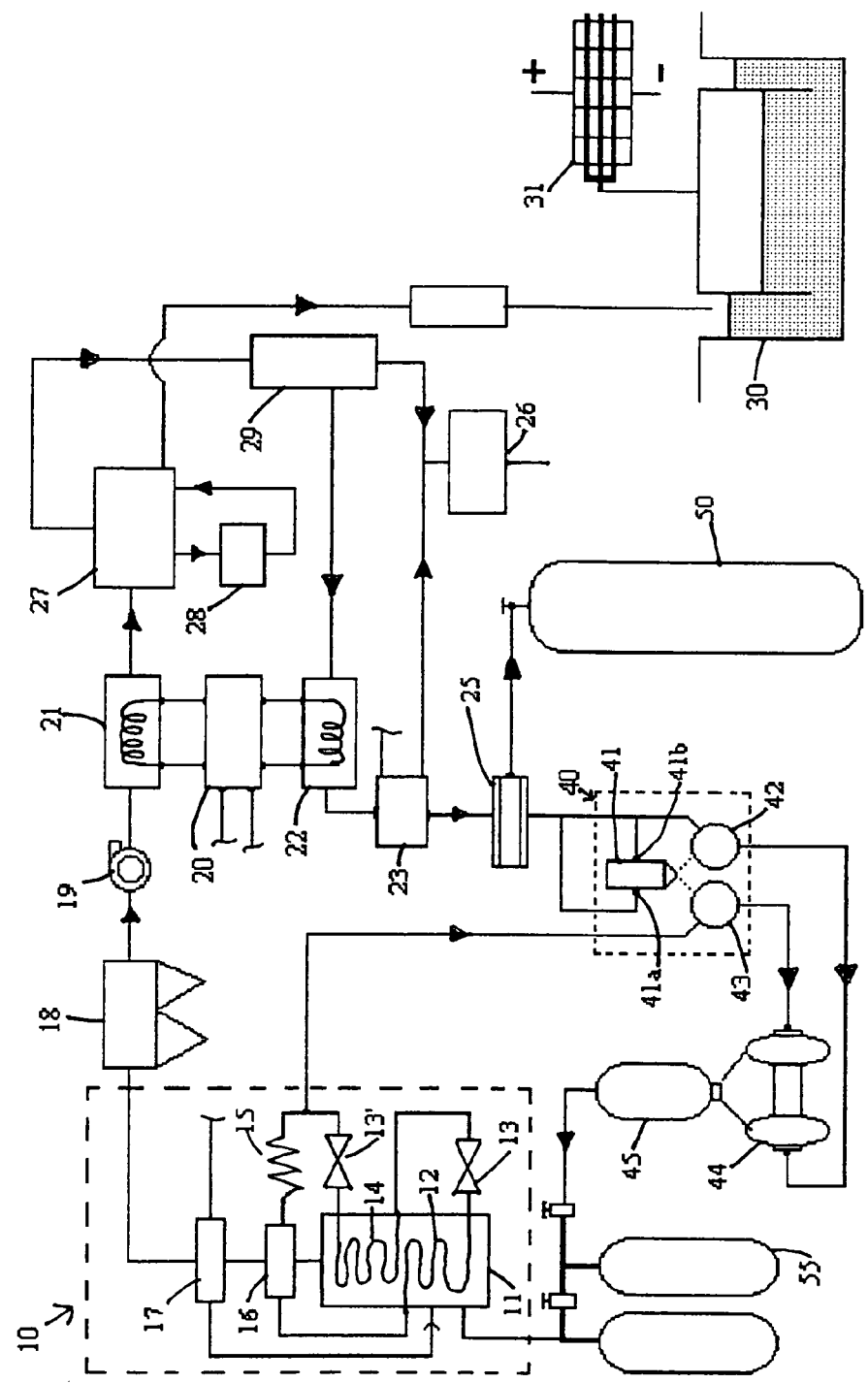
FIG. 1 is a schematic block diagram indicating interconnected functional components and their positions relative to the inventive system.
Figure 2:
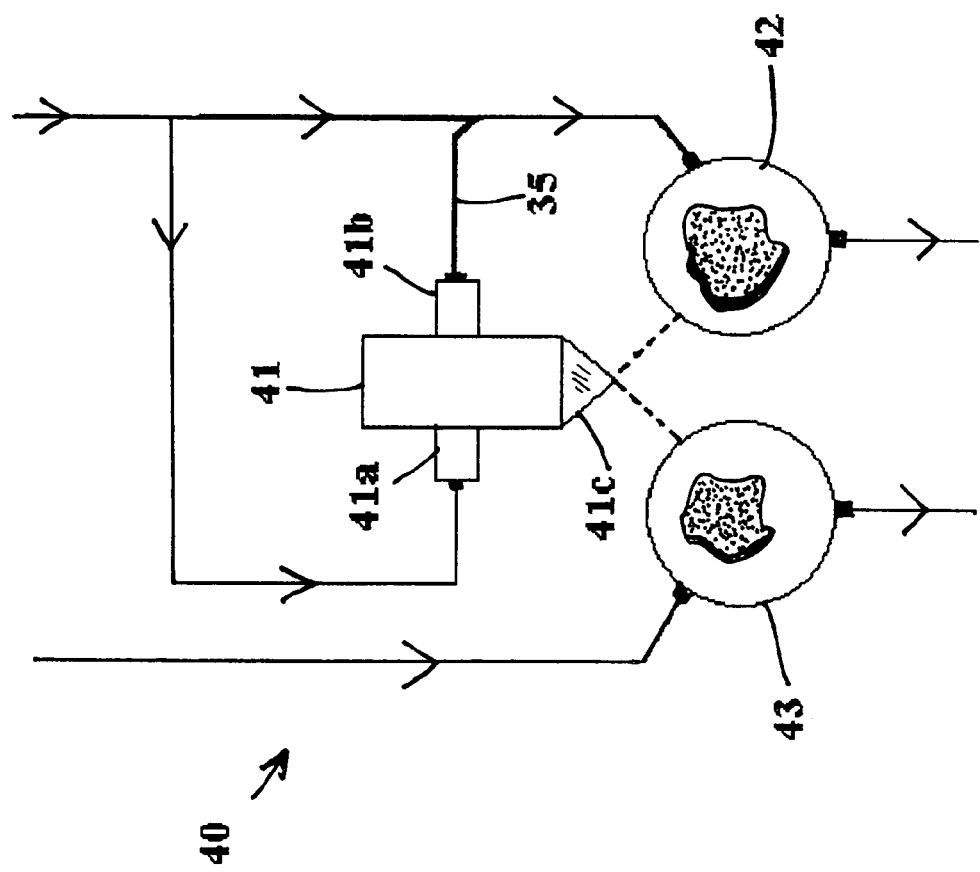
FIG. 2 is a schematic diagram depicting the preferred embodiment of the instant invention.
Figure 3:
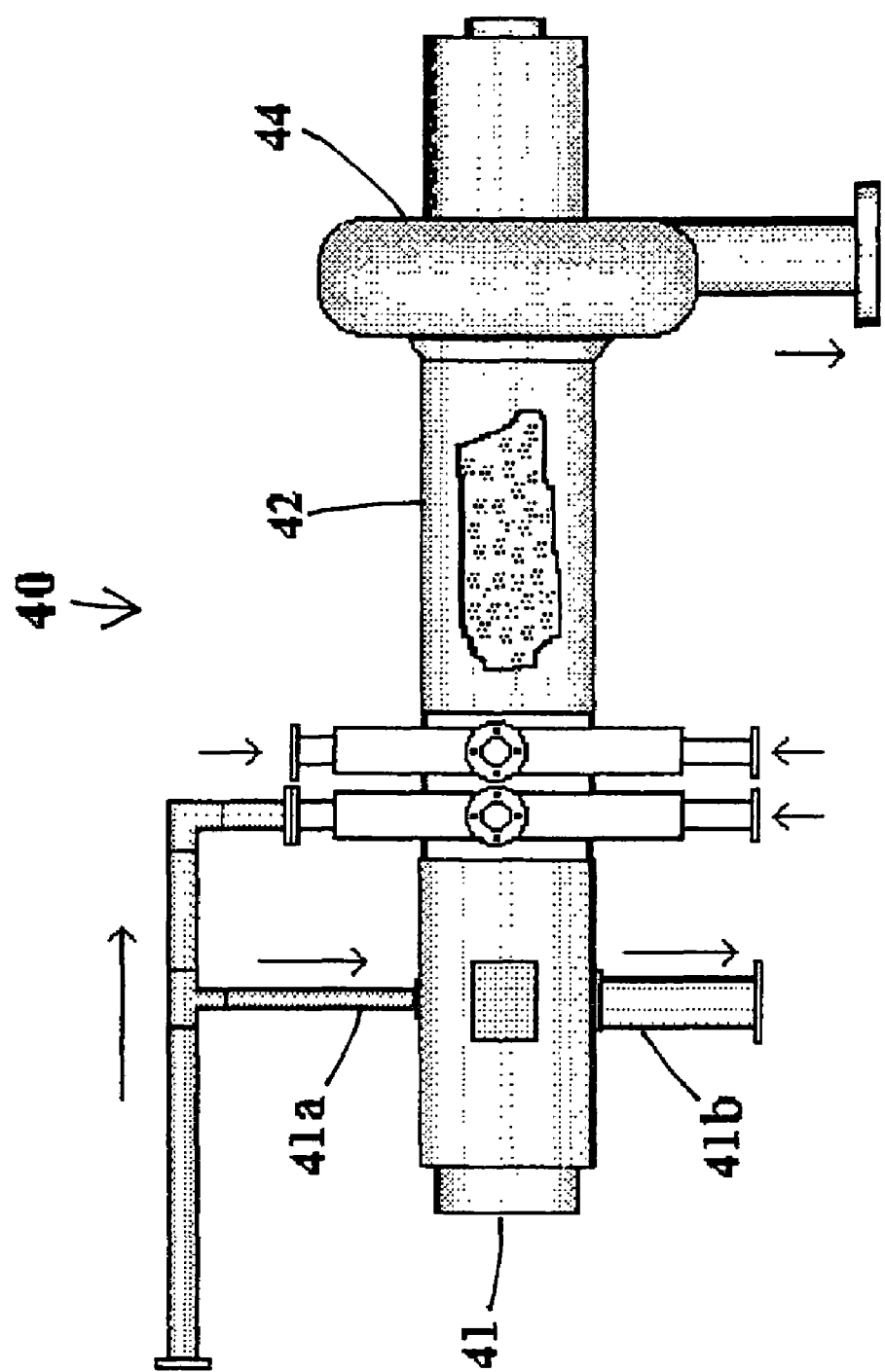
FIG. 3 is a partial cutaway view of a second embodiment of inventive system comprising a single laser powered converter element.

With reference to FIG. 1 a flue gas source 10 is depicted including furnace 11 wherein fuel mixed with air and burned. The conventional components of the furnace are shown as boiler superheater 12, steam turbine 13, intermediate turbine 13', secondary superheater 14, condenser 15, economizer 16, and air heater 17. The resultant flue gas is made to enter cyclone 18 wherein particulate matter is removed. If the fuel being burned is not coal, then 18 can be eliminated. Induction fan 19 draws the flue gas, which has a temperature of approximately 355 degrees Fahrenheit, out of the furnace and forces it into high temperature heat exchanger 21. Heat exchanger 21 which uses water as the exchange medium lowers the temperature of the gas to approximately 175 degrees Fahrenheit while simultaneously producing steam to drive lithium bromide chiller 20 which in turn produces forty degree water. Chiller 20 consumes 0.006% of power plant output (PPO). Upon exiting the heat exchanger the flue gas proceeds to a fibrous organic waste filter means 27 wherein the flue gas at a temperature of approximately 175 degrees Fahrenheit conditions an organic waste mixture, preparing the mixture for digestion in biogas production unit 30. The biogas production unit otherwise known as a methane digester produces methane gas which is extracted and consumed in fuel cell 31 thereby producing electricity. Other methods of utilizing the fuel can be employed. The fuel cell electrical production is equivalent to 1.1% of PPO and is intended to offset the penalty of operating the entire flue gas conversion system. The biogas production unit also converts the spent fibrous organic waste into enormous amounts of topsoil. Upon leaving the organic waste filter means 27 the flue gas is cooled by pond water in heat exchanger 29 in order to remove the water contained in the gas. This stage consumes 0.28% of PPO and removes 100% of $H_2O$ plus 10% of $SO_2$ from the gas. The water now containing $SO_2$ is directed to sulfur recovery unit 26 where the sulfur is removed. The water is reused. Upon leaving the heat exchanger the temperature of the gas is approximately 150 degrees Fahrenheit. The gas now enters the low temperature heat exchanger 22 where it is cooled to approximately 60 degrees Fahrenheit. This heat exchanger uses the forty degree water produced in chiller 20 as the exchange medium. Immediately thereafter the gas is subjected to an open spray heat exchanger 23 using pond water as the medium of exchange and wherein the remainder of the sulfur dioxide is removed. The sulfur laden water is sent to a sulfur recovery unit 26 where the sulfur is removed and the water returned to the pond. If natural gas is the fuel as illustrated in FIG. 1 then the remaining gas mixture is already $CO_2$, and $N_2$, therefore no heat exchanger 23 or sulfur removal component 26 is required. If coal is being burned in the furnace, the remaining mixture consists of nitrogen ($N_2$), oxygen ($O_2$), and $CO_2$, the ratio between $N_2$ and $CO_2$ approximately 3:1, $N_2$ predominating. A gas separation means 25 now receives the mixture wherein the nitrogen is removed and stored in vessel 50 for sale or other uses. The remaining gas, now a significantly pure form of carbon dioxide, enters gas converter 40 where it is converted to carbon monoxide. With reference to FIG. 2 the converter 40 is comprised of a flowing gas infrared laser 41, and a first catalytic converter 42. The flowing gas laser includes a gas inlet 41a and a gas outlet 41b. Carbon dioxide gas flowing through laser 41 exits at gas outlet 41b and is directed through interconnection means 35 which is in communication with the inlet of converter 42. By entering converter 42 the expended laser medium joins the main stream of carbon dioxide gas entering converter 42 as well. In this manner a portion of the actual gas used as the reactant in the catalytic converter is first utilized as a medium for the creation of the laser beam. With further reference to FIG. 2 beamsplitter 41c, splits the laser beam into multiple separate beams thus allowing laser 41 to accommodate a plurality of catalytic converters. Other distinct tasks normally associated with a laser are possible by spitting the beam, apart from the primary function which is to provide an energy source for catalytic conversion. The laser, otherwise known as a "Gas Dynamic Laser" is of a type manufactured by United Technologies Inc., and is marketed for industrial use. Given the amount of carbon dioxide available, an enormously powerful beam can be created. It is noted here that a plurality of converter 40 may be utilized depending upon the quantity of gas to process. During operation carbon monoxide is produced in a first catalytic converter 42 by passing carbon dioxide over the laser heated catalyst carbon, the chemical equation being $CO_2+C=2CO$. Other suitable catalysts can be substituted. Hydrogen is produced in a second catalytic converter 43 by passing steam over the catalyst iron, which is heated by the powerful laser beam created by laser 41, the chemical equation being $4H_2O+3Fe=Fe_3O_4+4H_2$. Here again other suitable catalysts may be substituted. The produced gases are then introduced through compressor 44 into mixer 45 where they are chemically combined, thereby producing a hydrocarbon fuel product. The mixer 45 may embody a separate catalytic converter. The product of the reactants is then stored in vessel 55 for the purpose of burning in the furnace boiler. Since each of converter element 42 and 43 can be constructed with a plurality of inlet connection points, another similar technique to manufacture a hydrocarbon fuel product with the apparatus can be employed. This method involves passing both steam and carbon dioxide over a select catalyst of a singular converter element of the reformer 40, thereby resulting in $CO+H_2$ a well known gaseous fuel. Furthermore, the elements Hydrogen, Carbon, Sulfur, Nitrogen, and Oxygen, all of which are mentioned in the foregoing specification, are all capable of being chemically combined in one way or another. Thus, the creation of a myriad of other useful products from the combination of these elements is another distinct possibility.

Accordingly, while a preferred embodiment of the present invention is shown and described herein, it will be understood that the invention may be embodied otherwise than as herein specifically illustrated or described, and that within the embodiments certain changes in the detail and construction, as well as the arrangement of the parts, may be made without departing from the principles of the present invention as defined by the appended claims.

Now that the invention has been described,

What is claimed is:

1. A flue gas conversion apparatus comprising, in combination:

(a) a carbon dioxide laser for the purpose of creating a laser beam;

(b) a plurality of catalytic conversion means, each of said means including at least one fluid inlet and at least one fluid outlet, wherein at least one of said catalytic conversion means includes at least one fluid inlet for receiving a flue gas and at least one fluid outlet for discharging a converted flue gas;

(c) a means to split said laser beam into a plurality of beams, whereby at least one element of said split beam is directed to each of said plurality of catalytic conversion means, thereby causing a substantial temperature increase of said catalytic conversion means; and (d) a chemical combining means disposed in fluid communication with said fluid outlets of said plurality of catalytic conversion means, wherein the converted flue gas produced in said at least one catalytic conversion means is chemically combined, in said chemical combining means, with the converted fluids of the other remaining catalytic conversion means, to thereby produce a fuel product.

2. The flue gas conversion apparatus in claim 1, wherein said carbon dioxide laser is a flowing gas carbon dioxide laser, and wherein said laser includes a fluid inlet and a fluid outlet, whereby gaseous carbon dioxide is permitted to enter said laser, flow through said laser, and exit said laser.

3. The flue gas conversion apparatus in claim 2, further comprising fluid interconnection means for permitting said fluid outlet of said laser to interconnect with at least one of said fluid inlets of said catalytic conversion means, whereby said flowing gas of said laser is first utilized as a medium for creating said laser beam, and said medium is subsequently utilized as a reactant in said catalytic conversion means.

\* \* \* \* \*